United States Patent
Jeol et al.

(10) Patent No.: US 11,426,928 B2
(45) Date of Patent: Aug. 30, 2022

(54) ADDITIVE MANUFACTURING METHOD FOR MAKING A THREE-DIMENSIONAL OBJECT USING SELECTIVE LASER SINTERING

(71) Applicant: SOLVAY SPECIALTY POLYMERS USA, LLC, Alpharetta, GA (US)

(72) Inventors: Stéphane Jeol, Cumming, GA (US); Christopher Ward, Sandy Springs, GA (US); Vito Leo, Glimes (BE)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 173 days.

(21) Appl. No.: 16/646,158

(22) PCT Filed: Sep. 14, 2018

(86) PCT No.: PCT/EP2018/074984
§ 371 (c)(1),
(2) Date: Mar. 11, 2020

(87) PCT Pub. No.: WO2019/053239
PCT Pub. Date: Mar. 21, 2019

(65) Prior Publication Data
US 2020/0269496 A1    Aug. 27, 2020

Related U.S. Application Data

(60) Provisional application No. 62/559,933, filed on Sep. 18, 2017.

(30) Foreign Application Priority Data

Dec. 14, 2017    (EP) .................................... 17207188

(51) Int. Cl.
| | |
|---|---|
| B29C 64/153 | (2017.01) |
| B29C 64/264 | (2017.01) |
| B33Y 10/00 | (2015.01) |
| B33Y 80/00 | (2015.01) |
| B29K 71/00 | (2006.01) |
| B29K 81/00 | (2006.01) |

(52) U.S. Cl.
CPC .......... *B29C 64/153* (2017.08); *B29C 64/264* (2017.08); *B29K 2071/00* (2013.01); *B29K 2081/06* (2013.01); *B33Y 10/00* (2014.12); *B33Y 80/00* (2014.12)

(58) Field of Classification Search
CPC .. B29C 64/153; B29C 64/264; B29K 2071/00; B29K 2081/06; B33Y 10/00; B33Y 80/00; C08G 2650/40; C08G 75/23; C08L 71/00
See application file for complete search history.

(56) References Cited

U.S. PATENT DOCUMENTS

| | | | |
|---|---|---|---|
| 2009/0295042 A1* | 12/2009 | Pfister | .......................... C08J 3/28 264/497 |
| 2015/0145168 A1 | 5/2015 | Rodgers et al. | |
| 2016/0122541 A1* | 5/2016 | Jaker | ....................... C08L 81/00 264/219 |
| 2017/0198104 A1* | 7/2017 | Bheda | ..................... B29C 48/92 |

FOREIGN PATENT DOCUMENTS

| | | |
|---|---|---|
| EP | 3210763 A1 | 8/2017 |
| GB | 2542704 A | 3/2017 |
| WO | 2015124903 A1 | 8/2015 |
| WO | 2018141973 A1 | 8/2018 |
| WO | WO 2019/053237 A1 | 3/2019 |

OTHER PUBLICATIONS

U.S. Appl. No. 16/646,159, Stephane Jeol, filed Mar. 11, 2020, Counterpart PCT Publication WO 2019/053237.
ASTM D3418-08—Standard Test Method for Transition Temperatures and Enthalpies of Fusion and Crystallization of Polymers by Differential Scanning Calorimetry, 2008, 7 pages.

* cited by examiner

*Primary Examiner* — Nahida Sultana
(74) *Attorney, Agent, or Firm* — Osha Bergman Watanabe & Burton LLP

(57) ABSTRACT

The present disclosure relates to an additive manufacturing (AM) method for making a three-dimensional (3D) object, comprising a) the provision of providing a powdered polymer material (M) comprising at least one poly(ether ether ketone) (PEEK) polymer, and at least one poly(aryl ether sulfone) (PAES) polymer, b) the deposition of successive layers of the powdered polymer material; and c) the selective sintering of each layer prior to the deposition of the subsequent layer, wherein the powdered polymer material (M) is heated before step c) to a temperature Tp (° C.): $Tp<Tg+40$, wherein Tg (° C.) is the glass transition temperature of the PAES polymer, as measured by differential scanning calorimetry (DSC) according to ASTM D3418.

24 Claims, No Drawings

ADDITIVE MANUFACTURING METHOD FOR MAKING A THREE-DIMENSIONAL OBJECT USING SELECTIVE LASER SINTERING

RELATED APPLICATIONS

This application is a U.S. national stage entry under 35 U.S.C. § 371 of International Application No. PCT/EP2018/074984 filed Sep. 14, 2018, which claims priority to U.S. provisional application 62/559,933 filed on Sep. 18, 2017 and to European application 17207188.8 filed on Dec. 14, 2017, the whole content of each of these applications being incorporated herein by reference for all purposes.

TECHNICAL FIELD

The present disclosure relates to an additive manufacturing (AM) method for making a three-dimensional (3D) object, using a powdered polymer material (M) comprising at least one poly(ether ether ketone) (PEEK) polymer, in particular to a 3D object obtainable by laser sintering from this powdered polymer material (M).

BACKGROUND

Additive manufacturing systems are used to print or otherwise build 3D objects from a digital blueprint created with computer-aided design (CAD) modelling software. Selective laser sintering ("SLS"), one of the available additive manufacturing techniques, uses electromagnetic radiation from a laser to fuse powdered materials into a mass. The laser selectively fuses the powdered material by scanning cross-sections generated from the digital blueprint of the object on the surface of a powder bed. After a cross-section is scanned, the powder bed is lowered by one layer thickness, a new layer of material is applied, and the bed is rescanned. Locally full coalescence of polymer particles in the top powder layer is necessary as well as an adhesion with previous sintered layers. This process is repeated until the object is completed.

In the powder bed of the SLS printer, the powdered material is generally preheated to a processing temperature close to the melting point (Tm) of the resin. For semi crystalline polymers, crystallization (Tc) should be inhibited during printing as long as possible, at least for several sintered layers. The processing temperature must therefore be precisely adjusted between the melting temperature (Tm) and the crystallization temperature (Tc) of the semi crystalline polymer, also called the "sintering window". The preheating of the powder makes it easier for the laser to raise the temperature of the selected regions of layer of unfused powder to the melting point. The laser causes fusion of the powder only in locations specified by the input. Laser energy exposure is typically selected based on the polymer in use and to avoid polymer degradation.

When the process is completed, the non-fused powder is removed from the 3D object and can be recycled and reused in a subsequent SLS process.

Producing an article by laser sintering can take a long time, frequently more than 16 hours, even for small articles. This means that the powder material is submitted to high temperatures in the powder bed of the SLS printer for an extended period of time (called thermal aging). This can irreversibly affect the polymer material, in such a way that it is not recyclable anymore. Not only the chemical nature of the polymer is changed due to thermal aging, but also its mechanical properties of the polymer material such as its toughness. For some semi crystalline polymers, such as poly(ether ether ketone) (PEEK), the processing temperature is too high, causing degradation and/or crosslinking, which negatively affect SLS processability and recycling. The potential of the SLS process is therefore limited by the restricted number of materials optimised for the process.

European patent application number 17159923.6 filed by Applicant on Mar. 8, 2017, not yet published, generally relates to a method for manufacturing three-dimensional (3D) objects using an additive manufacturing system, where the 3D object is printed from a part material comprising a combination of at least one poly(aryl ether ketone) polymer (PAEK) and at least one poly(aryl ether sulfone) polymer (PAES). This document describes the use of such polymeric part material in different printing methods, notably Fused Filament Fabrication (FFF), Selective Laser Sintering (SLS) or continuous Fiber-Reinforced Thermoplastic (FRTP), where the obtained 3D objects have a density comparable to injection molded part, as well as a set of mechanical properties (e.g. tensile properties and impact resistance) comparable or even better than injection molded parts.

The laser sintering 3D printing method of the present invention is based on the use of a powdered material made of a blend of polymers comprising at least a semi-crystalline PEEK polymer and at least one amorphous PAES polymer, without significantly degrading and/or crosslinking the powdered material, thereby allowing unsintered material to be recycled and used in the manufacture of a new 3D object.

SUMMARY

The present invention relates to an additive manufacturing method for making a three-dimensional (3D) object. The method comprises the steps of:

a) providing a powdered polymer material (M) comprising:
   from 55 to 95 wt. % of at least one poly(ether ether ketone) (PEEK) polymer, and
   from 5 to 45 wt. % of at least one poly(aryl ether sulfone) (PAES) polymer, based on the total weight of the powdered polymer material (M);

b) depositing successive layers of the powdered polymer material (M); and c) selectively sintering each layer prior to deposition of the subsequent layer, wherein the powdered polymer material (M) is heated before step c) to a temperature Tp (° C.):

$$Tp < Tg+40$$

wherein Tg (° C.) is the glass transition temperature of the PAES polymer, as measured by differential scanning calorimetry (DSC) according to ASTM D3418.

The method for manufacturing a 3D object of the present invention employs a powdered polymer material (M) comprising a PEEK polymer as the main element of the polymer material, as well as a PAES polymer. The powdered polymer material (M) can have a regular shape such as a spherical shape, or a complex shape obtained by grinding/milling of pellets or coarse powder.

The present invention also relates to a powdered polymer material (M) comprising at least one PEEK polymer and at least one PAES polymer, said material (M) having for example a $d_{0.5}$-value ranging from 25 and 90 μm, as measured by laser scattering in isopropanol, as well as to the method for the production of a powdered polymer material (M) comprising at least one PEEK polymer and at least one PAES polymer, said method comprising a step of grinding a blend of at least the PEEK polymer and the PAES polymer, the blend being optionally cooled down to a temperature below 25° C. before and/or during grinding.

The 3D objects or articles obtainable by such method of manufacture can be used in a variety of final applications. Mention can be made in particular of implantable device, medical device, dental prostheses, brackets and complex shaped parts in the aerospace industry and under-the-hood parts in the automotive industry.

DISCLOSURE OF THE INVENTION

The present invention relates to an additive manufacturing method for making a three-dimensional (3D) object. The method comprises a first step of providing a powdered polymer material (M) comprising from 55 to 95 wt. % of at least one poly(ether ether ketone) (PEEK) polymer, and from 5 to 45 wt. % of at least one poly(aryl ether sulfone) (PAES) polymer, based on the total weight of the powdered polymer material (M). The method of the invention also comprises a step of depositing successive layers of the powdered polymer material and a step of selectively sintering each layer prior to deposition of the subsequent layer.

According to the present invention, the powdered polymer material (M) is heated before the sintering step to a temperature Tp (° C.):

$$Tp < Tg + 40$$

wherein Tg (° C.) is the glass transition temperature of the PAES polymer, as measured by differential scanning calorimetry (DSC) according to ASTM D3418.

The method of the present invention employs a powdered polymer material (M) comprising a PEEK polymer as the main element of the polymer material, as well as a PAES polymer. The powdered polymer material (M) can have a regular shape such as a spherical shape, or a complex shape obtained by grinding/milling of pellets or coarse powder.

In the process of the present invention, the powdered polymer material (M) is heated, for example in the powder bed of a SLS printer, prior to the sintering of a selected area of the powder layer (for example, by means of an electromagnetic radiation of the powder), at a processing temperature (Tp) which is Tp<Tg+40, where Tg is the glass transition temperature of the PAES amorphous polymer. The combination of the material and the choice of a specific processing temperature (Tp), based on the material composition, makes possible the recycling of the unsintered material and its reuse in the manufacture of a new 3D object. The powdered polymer material (M) is not significantly affected by the long-term exposure to the processing temperature and presents a set of characteristics (namely powder aspect and color, disaggregation and coalescence abilities) which is comparable to a new, unprocessed polymer material. This makes the used powder completely suitable for reuse in a laser sintering 3D printing process, without impacting the appearance and mechanical performances of the resulting printed article (notably the expected performance of the polymer materials, e.g. the toughness of the PEEK).

Powdered Polymer Material (M)

The powdered polymer material (M) employed in the method of the present invention comprises:
from 55 to 95 wt. % of at least one poly(ether ether ketone) (PEEK) polymer, and from 5 to 45 wt. % of at least one poly(aryl ether sulfone) (PAES) polymer, based on the total weight of the powdered polymer material (M).

The powdered polymer material (M) of the invention may include other components. For example, the material (M) may comprise at least one additive, notably at least one additive selected from the group consisting of flow agents, fillers, colorants, lubricants, plasticizers, stabilizers, flame retardants, nucleating agents and combinations thereof. Fillers in this context can be reinforcing or non-reinforcing in nature.

In embodiments that include flow agents, the amount of flow agents in the material (M) ranges from 0.01 to 10 wt. %, with respect to the total weight of the part material.

In embodiments that include fillers, the amount of fillers in the material (M) ranges from 0.5 wt. % to 30 wt. %, with respect to the total weight of the material (M). Suitable fillers include calcium carbonate, magnesium carbonate, glass fibers, graphite, carbon black, carbon fibers, carbon nanofibers, graphene, graphene oxide, fullerenes, talc, wollastonite, mica, alumina, silica, titanium dioxide, kaolin, silicon carbide, zirconium tungstate, boron nitride and combinations thereof.

According to one embodiment, the material (M) of the present invention comprises:
from 56 to 95 wt. %, from 57 to 90 wt. %, from 58 to 85 wt. % or from 59 to 80 wt. % of at least one poly(ether ether ketone) (PEEK) polymer,
from 5 to 44 wt. %, from 10 to 43 wt. %, from 15 to 42 wt. % or from 20 to 41 wt. % of at least one poly(aryl ether sulfone) (PAES) polymer,
from 0 to 30 wt. % of at least one additive, for example selected from the group consisting of flow agents, fillers, colorants, dyes, pigments, lubricants, plasticizers, flame retardants (such as halogen and halogen free flame retardants), nucleating agents, heat stabilizer, light stabilizer, antioxidants, processing aids, nanofillers and electromagnetic absorbers, based on the total weight of the powdered polymer material (M).

According to one embodiment, the material (M) of the present invention comprises:
from 56 to 95 wt. %, from 57 to 90 wt. %, from 58 to 85 wt. % or from 59 to 80 wt. % of at least one poly(ether ether ketone) (PEEK) polymer,
from 5 to 44 wt. %, from 10 to 43 wt. %, from 15 to 42 wt. % or from 20 to 41 wt. % of at least one poly(biphenyl ether sulfone) polymer (PPSU) polymer and/or one polysulfone (PSU) polymer,
from 0 to 30 wt. % of at least one additive, or from 0.1 to 28 wt. % or from 0.5 to 25 wt. % of at least one additive, for example selected from the group consisting of flow agents, fillers, colorants, dyes, pigments, lubricants, plasticizers, flame retardants (such as halogen and halogen free flame retardants), nucleating agents, heat stabilizer, light stabilizer, antioxidants, processing aids, nanofillers and electromagnetic absorbers, based on the total weight of the powdered polymer material (M).

Poly(Ether Ether Ketone) (PEEK)

As used herein, a poly(ether ether ketone) (PEEK) denotes any polymer comprising at least 50 mol. % of recurring units ($R_{PEEK}$) of formula (J-A), based on the total number of moles in the polymer:

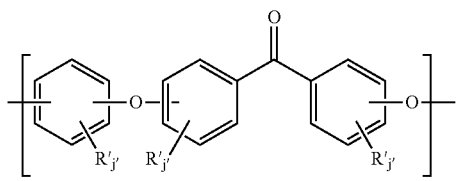

(J-A)

where
R', at each location, is independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and j', for each R', is independently zero or an integer ranging from 1 to 4 (for example 1, 2, 3 or 4).

Each phenylene moiety of the recurring unit ($R_{PEEK}$) may, independently from one another, have a 1,2-, a 1,3- or a 1,4-linkage to the other phenylene moieties. According to an embodiment, each phenylene moiety of the recurring unit ($R_{PEEK}$), independently from one another, has a 1,3- or a 1,4-linkage to the other phenylene moieties. According to another embodiment yet, each phenylene moiety of the recurring unit ($R_{PEEK}$) has a 1,4-linkage to the other phenylene moieties.

According to an embodiment, R' is, at each location in formula (J-A) above, independently selected from the group consisting of a C1-C12 moiety optionally comprising one or more than one heteroatoms; sulfonic acid and sulfonate groups; phosphonic acid and phosphonate groups; amine and quaternary ammonium groups.

According to another embodiment, j' is zero for each R'. In other words, according to this embodiment, the recurring units ($R_{PEEK}$) are according to formula (J'-A):

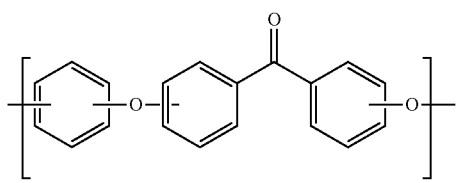

(J'-A)

According to an embodiment of the present disclosure, at least 50 mol. %, at least 60 mol. %, at least 70 mol. %, at least 80 mol. %, at least 90 mol. %, at least 95 mol. %, at least 99 mol. % or all of the recurring units in the PEEK are recurring units ($R_{PEEK}$) of formulae (J-A) and/or (J'-A).

According to another embodiment of the present disclosure, a poly(ether ether ketone) (PEEK) denotes any polymer comprising at least 50 mol. % of the recurring units are recurring units ($R_{PEEK}$) of formula (J-A"):

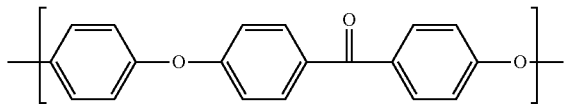

(J"-A)

the mol. % being based on the total number of moles in the polymer.

According to an embodiment of the present disclosure, at least 50 mol. %, at least 60 mol. %, at least 70 mol. %, at least 80 mol. %, at least 90 mol. %, at least 95 mol. %, at least 99 mol. % or all of the recurring units in the PEEK are recurring units ($R_{PEEK}$) of formula (J"-A).

The PEEK polymer of the present disclosure can therefore be a homopolymer or a copolymer. If it is a copolymer, it can be a random, alternate or block copolymer.

When the poly(ether ether ketone) (PEEK) is a copolymer, it can be made of recurring units ($R^*_{PEEK}$), different from recurring units ($R_{PEEK}$), such as recurring units of formula (J-D):

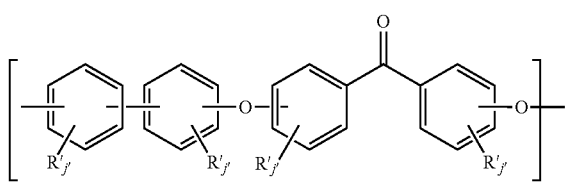

(J-D)

where
R', at each location, is independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and j', for each R', is independently zero or an integer ranging from 1 to 4.

According to an embodiment, R' is, at each location in formula (J-D) above, independently selected from the group consisting of a C1-C12 moiety optionally comprising one or more than one heteroatoms; sulfonic acid and sulfonate groups; phosphonic acid and phosphonate groups; amine and quaternary ammonium groups.

According to an embodiment, j' is zero for each R'. In other words, according to this embodiment, the recurring units ($R^*_{PEEK}$) are according to formula (J'-D):

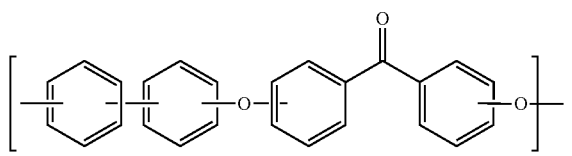

(J'-D)

According to another embodiment of the present disclosure, the recurring units ($R^*_{PEEK}$) are according to formula (J-D"):

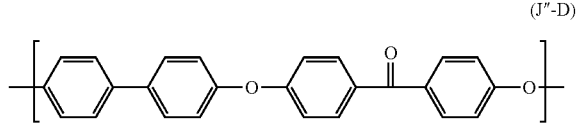

(J"-D)

According to an embodiment of the present disclosure, less than 50 mol. %, less than 40 mol. %, less than 30 mol. %, less than 20 mol. %, less than 10 mol. %, less than 5 mol. %, less than 1 mol. % or all of the recurring units in the PEEK are recurring units ($R^*_{PEEK}$) of formulas (J-D), (J'-D), and/or (J"-D).

According to an embodiment, the PEEK polymer is a PEEK-PEDEK copolymer. As used herein, a PEEK-PEDEK copolymer denotes a polymer comprising recurring units ($R_{PEEK}$) of formula (J-A), (J'-A) and/or (J"-A) and recurring units ($R^*_{PEEK}$) of formulas (J-D), (J'D) or (J"-D) (also called hereby recurring units ($R_{PEDEK}$)). The PEEK-PEDEK copolymer may include relative molar proportions of recurring units ($R_{PEEK}/R_{PEDEK}$) ranging from 95/5 to 51/49, from 90/10 to 55/45, or from 85/15 to 56/44. The sum of recurring units ($R_{PEEK}$) and ($R_{PEDEK}$) can for example represent at least 60 mol. %, 70 mol. %, 80 mol. %, 90 mol. %, 95 mol. %, 99 mol. %, of recurring units in the PEEK copolymer. The sum of recurring units ($R_{PEEK}$) and ($R_{PEDEK}$) can also represent 100 mol. %, of recurring units in the PEEK copolymer.

Defects, end groups and monomers' impurities may be incorporated in very minor amounts in the polymer (PEEK) of the present disclosure, so as to advantageously not affecting negatively the performances of the same.

PEEK is commercially available as KetaSpire® PEEK from Solvay Specialty Polymers USA, LLC.

PEEK can be prepared by any method known in the art. It can for example result from the condensation of 4,4'-difluorobenzophenone and hydroquinone in presence of a base. The reactor of monomer units takes place through a nucleophilic aromatic substitution. The molecular weight (for example the weight average molecular weight Mw) can be adjusted by adjusting the monomers molar ratio and measuring the yield of polymerisation (e.g. measure of the torque of the impeller that stirs the reaction mixture).

According to one embodiment of the present disclosure, the powdered polymer material (M) comprises at least one PEEK polymer having a weight average molecular weight (Mw) ranging from 50,000 to 150,000 g/mol, for example from 55,000 to 130,000 g/mol, from 60,000 to 120,000 g/mol, from 65,000 to 110,000 g/mol, or from 70,000 to 100,000 g/mol (as determined by gel permeation chromatography (GPC) using phenol and trichlorobenzene (1:1) at 160° C., with polystyrene standards).

According to another embodiment, the powdered polymer material (M) comprises at least two PEEK polymers of different Mw. In this case, the blend may for example comprise:
- a PEEK polymer having a Mw ranging from 50,000 to 85,000 g/mol, for example from 52,000 to 83,000 g/mol or from 54,000 to 81,000 g/mol, and
- a PEEK polymer having a Mw ranging from 85,000 to 120,000 g/mol, from 87,000 to 118,000 g/mol or from 89,000 to 116,000 g/mol, as determined by gel permeation chromatography (GPC) using phenol and trichlorobenzene (1:1) at 160° C., with polystyrene standards.

The weight average molecular weight (Mw) of PEEK, can be determined by gel permeation chromatography (GPC) using phenol and trichlorobenzene (1:1) at 160° C. (2× PL Gel mixed B, 10 m, 300×7.5 mm using a Polymer Laboratories PL-220 unit; flow rate: 1.0 mL/min; injection volume: 200 μL of a 0.2w/v % sample solution), with polystyrene standards.

More precisely, the weight average molecular weight (Mw) can be measured by gel permeation chromatography (GPC) as described in the experimental section. According to a detailed method, samples are dissolved in a 1:1 mixture of phenol and 1,2,4-trichlorobenzene at 190° C. temperature. Samples are then passed through 2× PL Gel mixed B, 10 m, 300×7.5 mm using a Polymer Laboratories PL-220 unit maintained at 160° C. equipped with a differential refractive index detector and calibrated with 12 narrow molecular weight polystyrene standards (Peak molecular weight range: 1,000-1,000,000). A flow rate of 1.0 mL/min and injection volume of 200 μL of a 0.2w/v % sample solution are selected.

The polymers can be characterized by their weight average molecular weight (Mw), and they can also be characterized by their polydispersity index ("PDI" or "PDI index" herewith), also called sometimes polymolecularity index. The PDI index corresponds to the molar weight distribution of the various macromolecules within the polymer. The PDI index corresponds to the ratio Mw/Mn, Mn being the number average molecular weight and determined by GPC.

According to another embodiment of the present disclosure, the PDI index of the PEEK polymer or PEEK polymers blend is from 1.8 to 2.5, for example from 1.9 to 2.4 or 1.95 to 2.3.

According to the present invention, the melt flow rate or melt flow index (at 400° C. under a weight of 2.16 kg according to ASTM D1238) (MFR or MFI) of the PEEK may be from 1 to 60 g/10 min, for example from 2 to 50 g/10 min or from 2 to 40 g/10 min.

According to one embodiment, the melt flow rate (at 400° C. under a weight of 2.16 kg according to ASTM D1238) of the PEEK is from 1 to 10 g/10 min, for example from 1.5 to 8 g/10 min or from 2 to 5 g/10 min.

According to another embodiment, the melt flow rate (at 400° C. under a weight of 2.16 kg according to ASTM D1238) of the PEEK is from 20 to 60 g/10 min, for example from 25 to 55 g/10 min or from 27 to 50 g/10 min.

Poly(Aryl Ether Sulfone) (PAES)

For the purpose of the present invention, a "poly(aryl ether sulfone) (PAES)" denotes any polymer comprising at least 50 mol. % of recurring units ($R_{PAES}$) of formula (K), based on the total number of moles in the polymer:

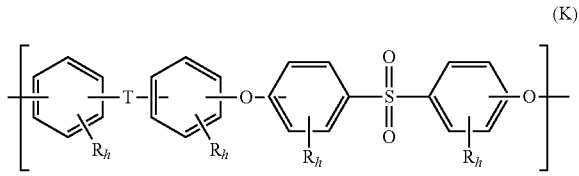

(K)

where
- R, at each location, is independently selected from a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium;
- h, for each R, is independently zero or an integer ranging from 1 to 4; and
- T is selected from the group consisting of a bond and a group —C(Rj)(Rk)-, where Rj and Rk, equal to or different from each other, are selected from a hydrogen, a halogen, an alkyl, an alkenyl, an alkynyl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium.

According to an embodiment, Rj and Rk are methyl groups.

According to an embodiment, h is zero for each R. In other words, according to this embodiment, the recurring units ($R_{PAES}$) are units of formula (K'):

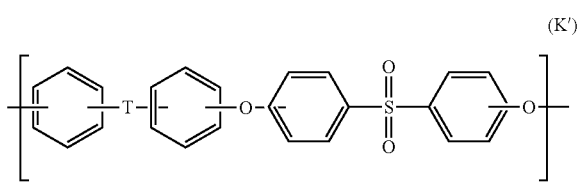

(K')

According to an embodiment of the present invention, at least 60 mol. %, at least 70 mol. %, at least 80 mol. %, at least 90 mol. %, at least 95 mol. %, at least 99 mol. % or all of the recurring units in the PAES are recurring units ($R_{PAES}$) of formula (K) or formula (K').

According to an embodiment, the PAES has a Tg ranging from 160 and 250° C., preferably from 170 and 240° C., more preferably from 180 and 230° C., as measured by differential scanning calorimetry (DSC) according to ASTM D3418.

According to an embodiment, the poly(aryl ether sulfone) (PAES) is a poly(biphenyl ether sulfone) (PPSU).

A poly(biphenyl ether sulfone) polymer is a polyarylene ether sulfone which comprises a biphenyl moiety. Poly(biphenyl ether sulfone) is also known as polyphenyl sulfone (PPSU) and for example results from the condensation of 4,4'-dihydroxybiphenyl (biphenol) and 4,4'-dichlorodiphenyl sulfone.

For the purpose of the present invention, a poly(biphenyl ether sulfone) (PPSU) denotes any polymer comprising at least 50 mol. % of recurring units ($R_{PPSU}$) of formula (L), based on the total number of moles in the PPSU polymer:

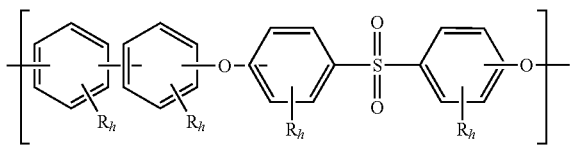

(L)

where
R, at each location, is independently selected from a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium;
h, for each R, is independently zero or an integer ranging from 1 to 4.

According to an embodiment, R is, at each location in formula (L) above, independently selected from the group consisting of a C1-C12 moiety optionally comprising one or more than one heteroatoms; sulfonic acid and sulfonate groups; phosphonic acid and phosphonate groups; amine and quaternary ammonium groups.

According to an embodiment, h is zero for each R. In other words, according to this embodiment, the recurring units ($R_{PPSU}$) are units of formula (L'):

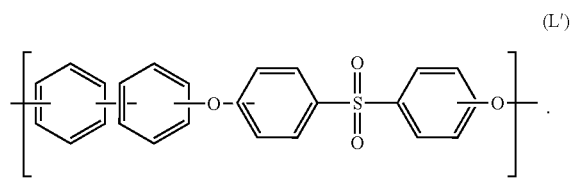

(L')

According to another embodiment, the recurring units ($R_{PPSU}$) are units of formula (L"):

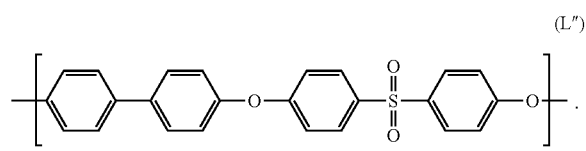

(L")

The PPSU polymer of the present invention can therefore be a homopolymer or a copolymer. If it is a copolymer, it can be a random, alternate or block copolymer.

According to an embodiment of the present invention, at least 60 mol. %, at least 70 mol. %, at least 80 mol. %, at least 90 mol. %, at least 95 mol. %, at least 99 mol. % or all of the recurring units in the PPSU are recurring units ($R_{PPSU}$) of formula (L), (L') and/or (L").

When the poly(biphenyl ether sulfone) (PPSU) is a copolymer, it can be made of recurring units ($R^*_{PPSU}$), different from recurring units ($R_{PPSU}$), such as recurring units of formula (M), (N") and/or (O):

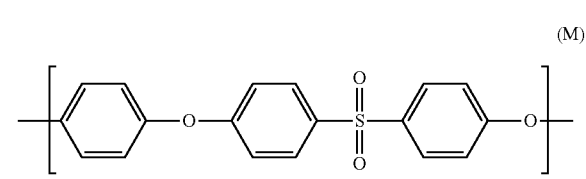

(M)

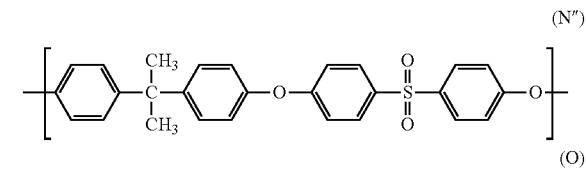

(N")

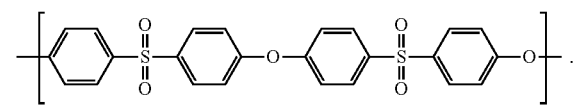

(O)

The poly(biphenyl ether sulfone) (PPSU) can also be a blend of a PPSU homopolymer and at least one PPSU copolymer, as described above.

The poly(biphenyl ether sulfone) (PPSU) can be prepared by any method known in the art. It can for example result from the condensation of 4,4'-dihydroxybiphenyl (biphenol) and 4,4'-dichlorodiphenyl sulfone in presence of a base. The reaction of monomer units takes place through nucleophilic aromatic substitution with the elimination of one unit of hydrogen halide as leaving group. It is to be noted however that the structure of the resulting poly(biphenyl ether sulfone) does not depend on the nature of the leaving group.

PPSU is commercially available as Radel® PPSU from Solvay Specialty Polymers USA, L. L. C.

According to the present invention, the powdered polymer material (M) comprises from 5 to 45 wt. % of a poly(aryl ether sulfone) (PAES), for example from 5 to 45 wt. % of a poly(biphenyl ether sulfone) (PPSU).

According to one embodiment, the powdered polymer material (M) comprises from 15 to 43 wt. % or from 17 to 43 wt. %, of poly(biphenyl ether sulfone) (PPSU), based on the total weight of the powdered polymer material (M).

According to the present invention, the weight average molecular weight Mw of the PPSU may be from 30,000 to 80,000 g/mol, for example from 35,000 to 75,000 g/mol or from 40,000 to 70,000 g/mol.

According to the present invention, the melt flow rate or melt flow index (at 365° C. under a weight of 5 kg according to ASTM D1238) (MFR or MFI) of the PPSU may be from 1 to 60 g/10 min, for example from 5 to 50 g/10 min or from 10 to 40 g/10 min.

According to an embodiment, the poly(aryl ether sulfone) (PAES) in the powdered polymer material (M) is a polysulfone (PSU) polymer.

For the purpose of the present invention, a polysulfone (PSU) denotes any polymer comprising at least 50 mol. % recurring units ($R_{PSU}$) of formula (N), the mol. % being based on the total number of moles in the polymer:

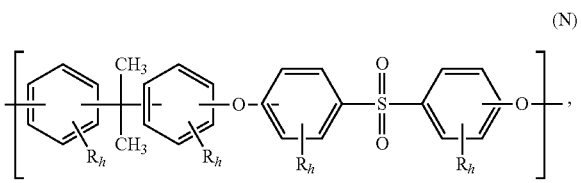

(N)

where
R, at each location, is independently selected from a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium;
h, for each R, is independently zero or an integer ranging from 1 to 4.

According to an embodiment, R is, at each location in formula (N) above, independently selected from the group consisting of a C1-C12 moiety optionally comprising one or more than one heteroatoms; sulfonic acid and sulfonate groups; phosphonic acid and phosphonate groups; amine and quaternary ammonium groups.

According to an embodiment, h is zero for each R. In other words, according to this embodiment, the recurring units ($R_{PSU}$) are units of formula (N'):

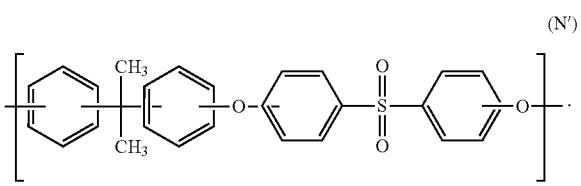

(N')

According to an embodiment of the present invention, at least 60 mol. % (based on the total number of moles in the polymer), at least 70 mol. %, at least 80 mol. %, at least 90 mol. %, at least 95 mol. %, at least 99 mol. % or all of the recurring units in the PSU are recurring units ($R_{PSU}$) of formula (N) and/or (N').

According to another embodiment, a polysulfone (PSU) denotes any polymer of which more at least 50 mol. % of the recurring units are recurring units ($R_{PSU}$) of formula (N"):

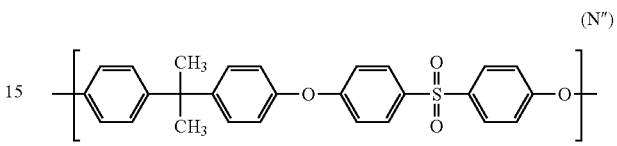

(N")

the mol. % being based on the total number of moles in the polymer.

According to an embodiment of the present invention, at least 60 mol. %, at least 70 mol. %, at least 80 mol. %, at least 90 mol. %, at least 95 mol. %, at least 99 mol. % or all of the recurring units in the PSU are recurring units ($R_{PSU}$) of formula (N").

The PSU polymer of the present invention can therefore be a homopolymer or a copolymer. If it is a copolymer, it can be a random, alternate or block copolymer.

When the polysulfone (PSU) is a copolymer, it can be made of recurring units ($R*_{PSU}$), different from recurring units ($R_{PSU}$), such as recurring units of formula (L"), (M) and/or (O) above described.

The polysulfone (PSU) can also be a blend of a PSU homopolymer and at least one PSU copolymer, as described above.

PSU is available as Udel® PSU from Solvay Specialty Polymers USA, L. L. C.

According to the present invention, the powdered polymer material (M) comprises from 5 to 45 wt. % of a poly(aryl ether sulfone) (PAES), for example from 5 to 45 wt. % of a polysulfone (PSU).

According to one embodiment, the powdered polymer material (M) comprises from 15 to 43 wt. % or from 17 to 43 wt. %, of polysulfone (PSU), based on the total weight of the powdered polymer material (M).

According to the present invention, the weight average molecular weight Mw of the PSU may be from 30,000 to 85,000 g/mol, for example from 35,000 to 75,000 g/mol or from 40,000 to 70,000 g/mol.

According to the present invention, the melt flow rate or melt flow index (at 343° C. under a weight of 5 kg according to ASTM D1238) (MFR or MFI) of the PSU may be from 1 to 50 g/10 min, for example from 2 to 40 g/10 min or from 3 to 30 g/10 min.

The weight average molecular weight (Mw) of PAES, for example PPSU and PSU, can be determined by gel permeation chromatography (GPC) using methylene chloride as a mobile phase (2×5μ mixed D columns with guard column from Agilent Technologies; flow rate: 1.5 mL/min; injection volume: 20 μL of a 0.2 w/v % sample solution), with polystyrene standards.

More precisely, the weight average molecular weight (Mw) of the PAES polymer can be measured by gel permeation chromatography (GPC), using methylene chloride as the mobile phase. The following detailed method can for example be used: two 5μ mixed D columns with guard column from Agilent Technologies are used for separation.

An ultraviolet detector of 254 nm is used to obtain the chromatogram. A flow rate of 1.5 ml/min and injection volume of 20 μL of a 0.2 w/v % solution in mobile phase are selected. Calibration is performed with 12 narrow molecular weight polystyrene standards (Peak molecular weight range: 371,000 to 580 g/mol).

Optional Components

The powdered polymer material (M) of the present invention may further comprise a flow agent, also called sometimes flow aid. This flow agent may for example be hydrophilic. Examples of hydrophilic flow aids are inorganic pigments notably selected from the group consisting of silicas, aluminas and titanium oxide. Mention can be made of fumed silica.

Fumed silicas are commercially available under the trade name Aerosil® (Evonik) and Cab-O-Sil® (Cabot).

According to an embodiment of the present invention, the powdered polymer material (M) comprises from 0.01 to 10 wt. %, preferably from 0.05 to 5 wt. %, more preferably from 0.25 to 1 wt. % of a flow agent, for example of fumed silica.

These silicas are composed of nanometric primary particles (typically between 5 and 50 nm for fumed silicas). These primary particles are combined to form aggregates. In use as flow agent, silicas are found in various forms (elementary particles and aggregates).

The powdered polymer material (M) of the present invention may further comprise one or several additives, such as lubricants, heat stabilizers, light stabilizers, antioxidants, pigments, processing aids, dyes, fillers, nanofillers or electromagnetic absorbers. Examples of these optional additives are titanium dioxide, zinc oxide, cerium oxide, silica or zinc sulphide, glass fibers, carbon fibers.

The powdered polymer material (M) of the present invention may further comprise flame retardants such as halogen and halogen free flame retardants.

Method for Making a Three-Dimensional (3D) Object

The additive manufacturing method for making a three-dimensional (3D) object of the present invention comprises:
a) the provision of a powdered polymer material (M) comprising:
   from 55 to 95 wt. % of at least one PEEK polymer, and
   from 5 to 45 wt. % of at least one PAES polymer, for example a PPSU and/or a PSU, based on the total weight of the powdered polymer material (M);
b) the deposition of successive layers of the powdered polymer material (M); and
c) the selective sintering of each layer prior to deposition of the subsequent layer,
wherein the powdered polymer material (M) is heated before step c) to a temperature Tp (° C.):

$Tp<Tg+40$ for example $Tp≤Tg+30$, or $Tp≤Tg+20$, or $Tp≤Tg+10$, wherein Tg (° C.) is the glass transition temperature of the PAES polymer, as measured by differential scanning calorimetry (DSC) according to ASTM D3418.

The method of the present invention is conducted at a temperature where the thermal aging of the powdered polymer material, which can be assessed by the polymer aspect (for example color), the coalescence ability and the disaggregation ability, is significantly reduced. In other words, the powdered material shows no significant signs of thermal aging, can be recycled and use to prepare a new article by laser sintering 3D printing, as such or in combination with neat powdered polymer material.

According to an embodiment, the step of printing layers comprises selective sintering by means of a high power energy source, for example a high power laser source such as an electromagnetic beam source.

The 3D object/article/part may be built on substrate, for example an horizontal substrate and/or on a planar substrate. The substrate may be moveable in all directions, for example in the horizontal or vertical direction. During the 3D printing process, the substrate can, for example, be lowered, in order for the successive layer of unsintered polymeric material to be sintered on top of the former layer of sintered polymeric material.

According to an embodiment, the process further comprises a step consisting in producing a support structure. According to this embodiment, the 3D object/article/part is built upon the support structure and both the support structure and the 3D object/article/part are produced using the same AM method. The support structure may be useful in multiple situations. For example, the support structure may be useful in providing sufficient support to the printed or under-printing, 3D object/article/part, in order to avoid distortion of the shape 3D object/article/part, especially when this 3D object/article/part is not planar. This is particularly true when the temperature used to maintain the printed or under-printing, 3D object/article/part is below the re-solidification temperature of the powder.

The method of manufacture usually takes place using a printer. The printer may comprise a sintering chamber and a powder bed, both maintained at determined at specific temperatures.

The powder to be printed can be pre-heated to a processing temperature (Tp), above the glass transition (Tg) temperature of the powder. The preheating of the powder makes it easier for the laser to raise the temperature of the selected regions of layer of unfused powder to the melting point. The laser causes fusion of the powder only in locations specified by the input. Laser energy exposure is typically selected based on the polymer in use and to avoid polymer degradation.

According to the present invention, the powder is not significantly affected by the long-term exposure to the processing temperature and presents a set of characteristics (namely powder aspect and color, disaggregation and coalescence abilities) which is comparable to a new, unprocessed polymer material. This makes the used powder completely suitable for reuse in a laser sintering 3D printing process, without impacting the appearance and mechanical performances of the resulting printed article (notably the expected performance of the polymer materials).

Method for Producing the Powdered Polymer Material (M)

The present invention also relates to a method for the production of a powdered polymer material (M), comprising at least one PEEK polymer and at least one PAES polymer, said method comprising: a) a step of mixing the polymers together, for example blend compounding the polymers, and b) a step of grinding the resulting blended formulation, for example in the form of pellets, in order to obtain a powdered polymer material (M) having for example a $d_{0.5}$-value ranging from 25 from 90 μm, for example from 35 to 88 μm, or from 45 to 85 μm, as measured by laser scattering in isopropanol. The $d_{0.5}$, also called D50, is known as the median diameter or the medium value of the particle size distribution, it is the value of the particle diameter at 50% in the cumulative distribution. It means that 50% of the particles in the sample are larger than the $d_{0.5}$-value, and 50% of the particles in the sample are smaller than the $d_{0.5}$-value. D50 is usually used to represent the particle size of group of particles.

The pellets of blended formulations can for example be ground in a pinned disk mill, a jet mill/fluidized jet mil with classifier, an impact mill plus classifier, a pin/pin-beater mill or a wet grinding mill, or a combination of those equipment.

The pellets of blended formulations can be cooled before step c) to a temperature below the temperature at which the material becomes brittle, for example below 25° C. before being ground.

The step of grinding can also take place with additional cooling. Cooling can take place by means of liquid nitrogen or dry ice.

The ground powder can be separated, preferably in an air separator or classifier, to obtain a predetermined fraction spectrum.

According to an embodiment, the method for the production of a powdered polymer material (M) may further comprise, a step consisting in exposing the powder to a temperature (Ta) ranging from the glass transition temperature (Tg) of the PEEK polymer and the melting temperature (Tm) of the PEEK polymer, both Tg and Tm being measured using differential scanning calorimetry (DSC) according to ASTM D3418. The temperature Ta can be selected to be at least 20° C. above the Tg of the PEEK polymer, for example at least 30, 40 or 50° C. above the Tg of the PEEK polymer. The temperature Ta can be selected to be at least 5° C. below the Tm of the PEEK polymer, for example at least 10, 20 or 30° C. below the Tm of the PEEK polymer. The exposition of the powder to the temperature Ta can for example be by heat-treatment and can take place in an oven (static, continuous, batch, convection), fluid bed heaters. The exposition of the powder to the temperature Ta can alternatively be by irradiation with electromagnetic or particle radiation. The heat treatment can be conducted under air or under inert atmosphere. Preferably, the heat treatment is conducted under inert atmosphere, more preferably under an atmosphere containing less than 2% oxygen.

The present invention also relates to the powdered polymer material (M), comprising at least one PEEK polymer and at least one PAES polymer, obtainable by the process described above, for use in the manufacture of a 3D object using SLS.

3D Objects and Articles

The 3D objects or articles obtainable by such method of manufacture can be used in a variety of final applications. Mention can be made in particular of implantable device, medical device, dental prostheses, brackets and complex shaped parts in the aerospace industry and under-the-hood parts in the automotive industry.

Should the disclosure of any patents, patent applications, and publications which are incorporated herein by reference conflict with the description of the present application to the extent that it may render a term unclear, the present description shall take precedence.

EXAMPLES

The disclosure will be now described in more detail with reference to the following examples, whose purpose is merely illustrative and not intended to limit the scope of the disclosure.

Starting Materials

PEEK #1: a poly(ether ether ketone) (PEEK) having a MFI of 36 g/10 min (400° C./2.16 kg), prepared according to the following process:

In a 500 ml 4-neck reaction flask fitted with a stirrer, a N2 inlet tube, a Claisen adapter with a thermocouple plunging in the reaction medium, and a Dean-Stark trap with a condenser and a dry ice trap were introduced 128 g of diphenyl sulfone, 28.6 g of p-hydroquinone, and 57.2 g of 4,4'-difluorobenzophenone.

The reaction mixture was heated slowly to 150° C. At 150° C., a mixture of 28.43 g of dry $Na_2CO_3$ and 0.18 g of dry $K_2CO_3$ was added via a powder dispenser to the reaction mixture over 30 minutes. At the end of the addition, the reaction mixture was heated to 320° C. at 1° C./minute.

After 15 to 30 minutes, when the polymer had the expected Mw, the reaction was stopped by the introduction of 6.82 g of 4,4'-difluorobenzophenone to the reaction mixture while keeping a nitrogen purge on the reactor. After 5 minutes, 0.44 g of lithium chloride were added to the reaction mixture. 10 minutes later, another 2.27 g of 4,4'-difluorobenzophenone were added to the reactor and the reaction mixture was kept at temperature for 15 minutes. The reactor content was then cooled.

The solid was broken up and ground. The polymer was recovered by filtration of the salts, washing and drying.

TABLE 1

|  | PEEK #1 |
| --- | --- |
| MFI (400° C./2.16 kg) | 36 g/10 min |
| Tm (° C.) | 345 |
| Tg (° C.) | 150 |

PEEK #2: a poly(ether ether ketone) (PEEK) having a MFI of 3 g/10 min (400° C./2.16 kg), prepared according to the same process than PEEK #1, except that the reaction was stopped later.

TABLE 2

|  | PEEK #2 |
| --- | --- |
| MFI (400° C./2.16 kg) | 3 g/10 min |
| Tm (° C.) | 345 |
| Tg (° C.) | 150 |

PPSU: a poly(biphenyl ether sulfone) (PPSU) with a MFI of 17 g/10 min (365° C./5 kg), prepared according to the following process:

The synthesis of the PPSU was achieved by the reaction in a 1 L flask of 83.8 g of 4,4'-biphenol (0.450 mol), 131.17 g of 4,4'-dichlorodiphenyl sulfone (0.457 mol) dissolved in a mixture of 400 g of sulfolane with the addition of 66.5 g (0.481 mol) of dry $K_2CO_3$.

The reaction mixture was heated up to 210° C. and maintained at this temperature until the polymer had the expected Mw. An excess of methyl chloride was then added to the reaction.

The reaction mixture was diluted with 600 g of MCB. The poly(biphenyl ether sulfone) was recovered by filtration of the salts, coagulation, washing and drying.

TABLE 3

| | PPSU |
|---|---|
| MFI (365° C./5 kg) | 17 g/10 min |
| Tg (° C.) | 220 |

PSU #1: a polysulfone (PSU) with a MFI of 6.5 g/10 min (343° C./2.16 kg), prepared according to the following process:

The synthesis of the PSU was achieved by the reaction in a 1 L flask of 114.14 g (0.5 mol) of bisphenol A dissolved in a mixture of 247 g of dimethylsulfoxide (DMSO) and 319.6 g of monochlorobenzene (MCB) with an aqueous solution of 79.38 g of sodium hydroxide at 50.34%, followed by distillation of the water to generate a solution of bisphenol A sodium salt free from water by heating the solution up to 140° C. In the reactor was then introduced a solution of 143.59 g (0.5 mol) of 4,4'-dichlorodiphenyl sulfone in 143 g of MCB. The reaction mixture was heated up to 165° C. and maintained at this temperature during 15 to 30 min, until the polymer had the expected Mw. An excess of methyl chloride was then added to the reaction.

The reaction mixture was diluted with 400 mL of MCB and then cooled to 120° C. 30 g of methyl chloride was added over 30 min. The polysulfone was recovered by filtration of the salts, washing and drying.

TABLE 4

| | PSU |
|---|---|
| MFI (343° C./2.16 kg) | 6.5 g/10 min |
| Tg (° C.) | 190 |

Test Methods

Thermal Transitions (Tg, Tm)

The glass transition and melting temperatures of the polymers were measured using differential scanning calorimetry (DSC) according to ASTM D3418 employing a heating and cooling rate of 20° C./min. Three scans were used for each DSC test: a first heat up to 400° C., followed by a first cool down to 30° C., followed by a second heat up to 400° C. The Tg and the Tm were determined from the second heat up. DSC was performed on a TA Instruments DSC Q20 with nitrogen as carrier gas (99.998% purity, 50 mL/min).

MFI

The melt flow indices of the polymers were measured according to ASTM D-1238, using a weight of either 2.16 kg or 5 kg and a temperature of 400° C., 365° C. or 343° C. The measurements were conducted on a Dynisco D4001 Melt Flow Indexer.

PSD ($D_{0.5}$)

The PSD (volume distribution) of the powdered polymer materials were determined by an average of 3 runs using laser scattering Microtrac S3500 analyzer in wet mode (128 channels, between 0.0215 and 1408 μm). The solvent was isopropanol with a refractive index of 1.38 and the particles were assumed to have a refractive index of 1.59. The ultrasonic mode was enabled (25 W/60 seconds) and the flow was set at 55%.

Blend Compounding

The formulations were melt compounded using a 26 mm diameter Coperion® ZSK-26 co-rotating partially intermeshing twin screw extruder having an L/D ratio of 48:1. The barrel sections 2 through 12 and the die were heated to set point temperatures as follows:
Barrels 2-7: 350 to 360° C.
Barrels 8-12: 360° C.
Die: 360° C.

The resin blends were fed at barrel section 1 using a gravimetric feeder at throughput rates in the range 30-40 lb/hr. The extruder was operated at screw speeds of around 200 RPM. Vacuum was applied at barrel zone 10 with a vacuum level of about 27 inches of mercury. A single-hole die was used for all the compounds to give a filament approximately 2.6 to 2.7 mm in diameter and the polymer filament exiting the die was cooled in water and fed to the pelletizer to generate pellets approximately 2.7 mm in length.

Powdered Polymer Material Preparation

The blended formulations were slowly fed in combination with crushed dry ice into the feed port of a Retsch SR300 rotor mill, fitted with a 0.5 mm opening Conidur screen mounted in the reverse flow position and standard 6-blade rotor with a speed of 10,000 rpm.

The materials were re-mixed with crushed dry ice at 1 part resin and 2 parts dry ice to the Retsch SR300 with a 0.08 mm screen, also in the reverse flow position with a standard 6-blade rotor at 10,000 rpm.

TABLE 5

| | Blend 1<br>PEEK#1/PPSU<br>60/40 wt/wt | Blend 2<br>PEEK#2/PSU<br>63/37 wt/wt |
|---|---|---|
| $d_{0.5}$-value (μm) | 81.0 | 71.9 |

Heat Treatment

The aim of the heat treatments was to simulate long-term printing conditions within the print bed of an SLS printer and evaluate recyclability of the materials. More precisely, the materials were subjected to different heat treatment temperatures for 16 hours in an air convection oven and then tested for their retained sintering (coalescence) capability, thereby simulating a printing cycle. Recyclability was tested by examining remaining particle coalescence ability. Additionally, the powders were evaluated for their aspect and their disaggregation following heat treatments, that-is-to-say their ability to be broken apart by traditional sieving.

Generally speaking, as an example, a color change from off-white to brown, dark brown or black was considered as failing the recyclability requirement. Also, a powder material which could not be broken apart by traditional sieving, after a 16-hour long heat treatment at a certain temperature, was also considered as failing the recyclability requirement.

Hot Stage Microscopy

The aim of the hot stage microscopy tests was to study particle coalescence under experimental conditions that simulate the sintering step of the method for making a 3D object of the present invention, in order to compare sintering behaviour as a function of the exposition of different materials to high-temperature conditions within an air convection oven for 16 hours.

Coalescence was evaluated on a Keyence VHX 600K optical microscope with a digital zoom of 200×. A Linkam T96-PE hot-stage attachment was utilized in order to increase the temperature of the material in order to simulate the increased temperature of the material within an SLS printer upon printing.

The material was heated quickly (100° C./min) to 260° C. Following the rapid pre-heat, the material was subjected to a temperature increase at 20° C./min until reaching 400° C., at which point the temperature was held constant in order to observe coalescence. The temperature of 400° C. hereby simulates the energy source (for example laser) used to sinter selected regions of layer of unfused powder in a SLS equipment.

Coalescence was measured by observing two particles that were adjacent prior to heating. During the heating and isothermal phase at 400° C., the particles were observed to coalesce together, with a neck or bridge, formed between the two during intermediate steps.

Selective Laser Sintering

The aim of selective laser sintering was to examine the ability to sinter the selected materials and examine degree of coalescence of the powder composing the printed object.

Laser sintering was performed on a DTM (now 3D Systems) Sinterstation 2500 Plus using a CO2 laser at a wavelength of 10.6 micrometers.

The material was printed at a temperature between 180 and 200° C. with an exposure laser power between 4 and 40 Watts. The exposure speed was between 0.5 and 3 meters/sec. Printing was optimized using these settings.

Definitions and Results

Disaggregation

0=Not Aggregated: Powder particles are not closely associated together and the powder is loosely flowing.

1=Easy Disaggregation: Powder particles are closely associated together but can be easily broken back apart by traditional sieving.

2=Difficult Disaggregation: Powder particles have slightly fused together and cannot be broken back apart by traditional sieving.

3=No Disaggregation: Powder particles have fused together with no possible separation except by grinding.

Coalescence

Yes: Particles exhibit rapid coalescence between the temperatures of 355° C. and 365° C. during an increasing temperature ramp with rate of 20° C./min. No: Particles do not exhibit any coalescence between the temperatures of 355° C. and 365° C. during an increasing temperature ramp with rate of 20° C./min.

TABLE 6

| | E1 | E2 | E3 | E4c | E5c |
|---|---|---|---|---|---|
| | Blend 1 (PEEK#1/PPSU, Tg PPSU = 220° C.) | | | | |
| Treatment temperature (° C.) | none | 200 | 230 | 260 | 330 |
| Corresponding Tp (° C.) | n/a | Tg − 20 | Tg + 10 | Tg + 40 | Tg + 110 |
| Powder aspect | Off-white | Off-white | Off-white | Off-white | Dark brown |
| Disaggregation | 0 | 1 | 1 | 2 | 3 |
| Particle coalescence | Yes | Yes | Yes | Yes* | No |

*Exhibited extremely slow coalescence instead of rapid coalescence.

The color, the disaggregation and the coalescence ability of the powder of example E1 (no heat treatment) simulates the behaviour of the powder when used for the first time in a SLS printer.

The color, the disaggregation and the coalescence ability of the powder of example E2, which has been submitted to a 16-hour heat treatment at 200° C. (temperature lower than the glass transition of the amorphous polymer of powdered polymer material, i.e. PPSU) and E3, which has been submitted to a 16-hour heat treatment at 230° C. (temperature higher than the glass transition of the amorphous polymer of powdered polymer material, i.e. PPSU) are shown to be comparable to example E1. These results are in themselves unexpected in that the 16-hour long treatment at a temperature above (230° C.) or close (200° C.) to the Tg of the amorphous component of the blend (here PPSU with a Tg of 220° C.) does not significantly affect the resulting powder and makes the powder recyclable.

The powder of example E4c however demonstrates difficult disaggregation and decreased coalescence ability. The powder of example E4C treated 16 hours at a temperature of 260° C. (temperature 40° C. higher than the glass transition of the PPSU polymer) cannot not be recycled.

The powder of example E5c demonstrates a non-acceptable change of color, no possible disaggregation and no coalescence, which make them not recyclable at all.

TABLE 7

| | E6 | E7 | E8c | E9c |
|---|---|---|---|---|
| | Blend 2 (PEEK#2/PSU, Tg PSU = 190° C.) | | | |
| Treatment temperature (° C.) | none | 200 | 230 | 330 |
| Corresponding Tp (° C.) | n/a | Tg + 10 | Tg + 40 | Tg + 140 |
| Powder aspect | Off-white | Off-white | Off-white | Black |
| Disaggregation | 0 | 1 | 2 | 3 |
| Particle coalescence | Yes | Yes | No | No |

The color, the disaggregation and the coalescence ability of the powder of example E6 (no heat treatment) simulates the behaviour of the powder when used for the first time in a SLS printer.

The color, the disaggregation and the coalescence ability of the powder of example E7, which has been submitted to a 16-hour heat treatment at 200° C. (temperature higher than the glass transition of the amorphous polymer of powdered polymer material, i.e. PSU in this case) is shown to be comparable to example E6. Again here, the results are unexpected in that the 16-hour long heat treatment at 200° C., above the Tg of the amorphous PSU polymer (190° C.)

does not significantly affect the powder blend and makes to polymer combination recyclable.

The powder of examples E8c and E9c however failed the recyclability requirements (disaggregation and coalescence, plus non-acceptable color for E9c).

Example E10: A monolayer of Blend 1, printed with the defined print conditions, exhibits definite coalescence with no possibility of disaggregation. This printed monolayer demonstrates the ability to print at a temperature between 180 and 200° C., which is less than 260° C. (Tg+40). The powder surrounding this printed monolayer remains unsintered and not aggregated.

The invention claimed is:

1. An additive manufacturing method for making a three-dimensional (3D) object, comprising:
   a) providing a powdered polymer material (M) comprising:
      from 55 to 95 wt. % of at least one poly(ether ether ketone) (PEEK) polymer,
         wherein the PEEK polymer comprises at least 50 mol. % of recurring units ($R_{PEEK}$) of formula (J-A), based on the total number of moles in the polymer:

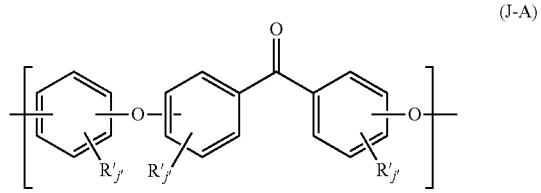

(J-A)

where R', at each location, is independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;
where j', for each R', is independently zero or an integer ranging from 1 to 4; and
      from 5 to 45 wt. % of at least one poly(aryl ether sulfone) (PAES) polymer, based on the total weight of the powdered polymer material (M), wherein the PAES polymer comprising at least 50 mol. % of recurring units ($R_{pAEs}$) of formula (K), based on the total number of moles in the polymer:

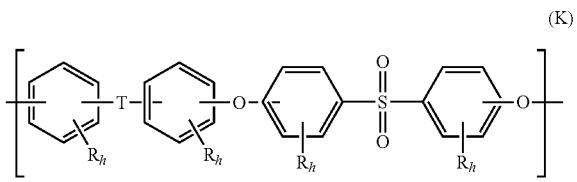

(K)

where R, at each location, is independently selected from the group consisting of a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium;

where h, for each R, is independently zero or an integer ranging from 1 to 4; and
where T is selected from the group consisting of a bond and a group—C(Rj)(Rk)—, where Rj and Rk, equal to or different from each other, are selected from the group consisting of a hydrogen, a halogen, an alkyl, an alkenyl, an alkynyl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium;
   b) depositing successive layers of the powdered polymer material (M); and
   c) selectively sintering each layer prior to deposition of the subsequent layer, wherein the powdered polymer material (M) is heated before step c) to a temperature Tp (° C.):

$$Tp<Tg+40$$

wherein Tg (° C.) is the glass transition temperature of the PAES polymer, as measured by differential scanning calorimetry (DSC) according to ASTM D3418.

2. The method of claim 1, wherein the powdered polymer material (M) has a dos-value ranging between 25 and 90 μm, as measured by laser scattering in isopropanol.

3. The method of claim 1 wherein the PAES polymer is a poly(biphenyl ether sulfone) (PPSU) polymer,
   wherein PPSU denotes a polymer comprising at least 50 mol. % of recurring units ($R_{ppsu}$) of formula (L), based on the total number of moles in the PPSU polymer:

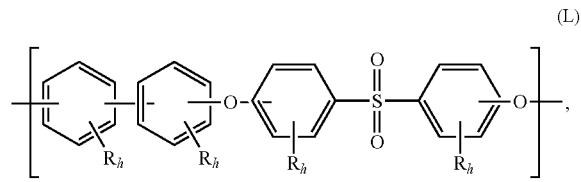

(L)

where R, at each location, is independently selected from a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; and
where h, for each R, is independently zero or an integer ranging from 1 to 4".

4. The method of claim 1, wherein the powdered polymer material (M) is heated before step c) to a temperature Tp (° C.):

$$Tp<Tg+30$$

wherein Tg (° C.) is the glass transition temperature of the PAES polymer, as measured by differential scanning calorimetry (DSC) according to ASTM D3418.

5. The method of claim 1, wherein the powdered polymer material (M) comprises:
   from 56 to 80 wt. % of at least one poly(ether ether ketone) (PEEK) polymer, and
   from 20 to 44 wt. % of at least one poly(aryl ether sulfone) (PAES) polymer, based on the total weight of the powdered polymer material (M).

6. The method of claim 1, wherein the powdered polymer material (M) further comprises 0.01 to 10 wt. % of a flow agent.

7. The method of claim 1, wherein the PAES has a Tg ranging from 160 and 250° C., as measured by differential scanning calorimetry (DSC) according to ASTM D3418.

8. The method of claim 1, wherein the powdered polymer material (M) is obtained by grinding a blend of at least the PEEK polymer and the PAES polymer, the blend being optionally cooled down to a temperature below 25° C. before and/or during grinding.

9. The method of claim 1, wherein step c) comprises selective sintering by means of an electromagnetic radiation of the powder.

10. A method for manufacturing a three-dimensional (3D) object comprising using selective laser sintering (SLS) with a powdered polymer material (M) having a $d_{0.5}$ value ranging from 25 to 90 μm and comprising:
from 55 to 95 wt. % of at least one poly(ether ether ketone) (PEEK) polymer, wherein the PEEK polymer denotes a polymer comprising at least 50 mol. % of the recurring units of formula (J″-A):

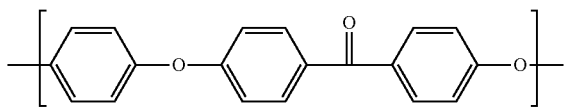

the mol. % being based on the total number of moles in the polymer from 5 to 45 wt. % of at least one poly(aryl ether sulfone) (PAES) polymer, based on the total weight of the powdered polymer material (M), wherein the PAES polymer denotes a polymer comprising at least 50 mol. % of recurring units of formula (K'), based on the total number of moles in the polymer:

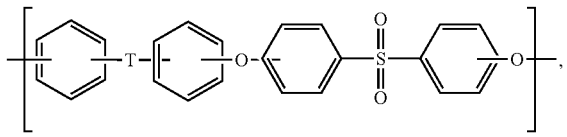

and
a flow agent selected from the group consisting of silicas, aluminas and titanium oxide.

11. The method of claim 1, wherein the PAES polymer is a polysulfone (PSU) polymer, wherein PSU denotes a polymer comprising at least 50 mol. % recurring units (RPSU) of formula (N), the mol. % being based on the total number of moles in the polymer:

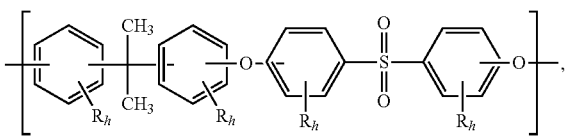

where R, at each location, is independently selected from a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; and where h, for each R, is independently zero or an integer ranging from 1 to 4".

12. The method of claim 1, wherein the PEEK has at least 50 mol. % of recurring units of formula (J″-A):

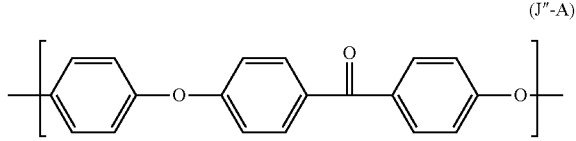

the mol. % being based on the total number of moles in the polymer.

13. The method of claim 1, wherein the PEEK has at least 80 mol. % of recurring units of formula (J″-A):

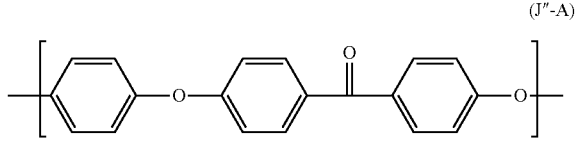

the mol. % being based on the total number of moles in the polymer.

14. The method of claim 1, wherein the PEEK has at least 90 mol. % of recurring units of formula (J″-A):

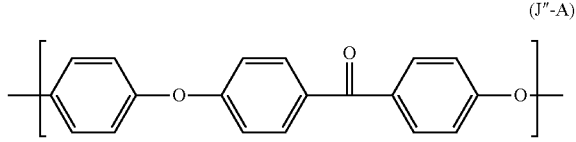

the mol. % being based on the total number of moles in the polymer.

15. The method of claim 1, wherein the PEEK has at least 95 mol. % of recurring units of formula (J″-A):

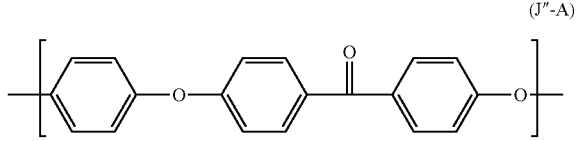

the mol. % being based on the total number of moles in the polymer.

16. The method of claim 1, wherein the PEEK is a copolymer that has at least 50 mol. % of recurring units of formula (J″-A):

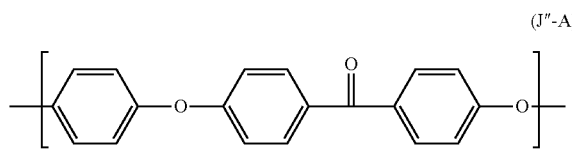
(J''-A)

the mol. % being based on the total number of moles in the polymer, and
wherein the PEEK has less than 50 mol. % of recurring units of formula (J''-D):

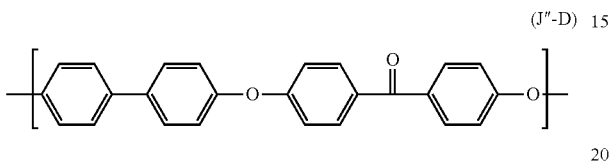
(J''-D)

the mol. % being based on the total number of moles in the polymer.

17. The method of claim 1, wherein the PAES polymer is a PPSU comprising at least 50 mol. % of recurring units of formula (L''):

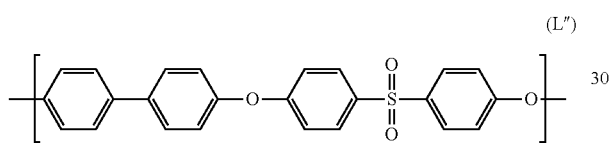
(L'')

the mol. % being based on the total number of moles in the polymer.

18. The method of claim 1, wherein the PAES polymer is a PPSU comprising at least 80 mol. % of recurring units of formula (L''):

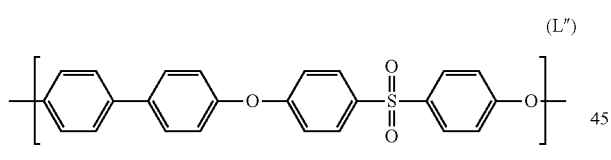
(L'')

the mol. % being based on the total number of moles in the polymer.

19. The method of claim 1, wherein the PAES polymer is a PPSU comprising at least 90 mol. % of recurring units of formula (L''):

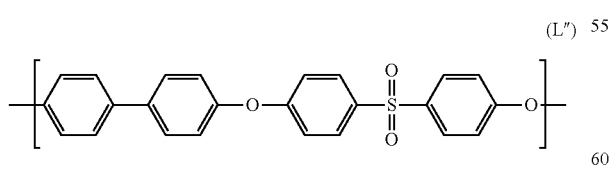
(L'')

the mol. % being based on the total number of moles in the polymer.

20. The method of claim 1, wherein the PAES polymer is a PPSU comprising at least 95 mol. % of recurring units of formula (L''):

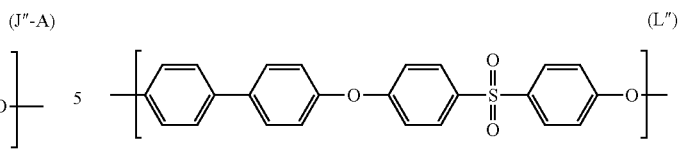
(L'')

the mol. % being based on the total number of moles in the polymer.

21. The method of claim 1, wherein the PAES polymer is a PSU comprising at least 50 mol. % of recurring units of formula (N''):

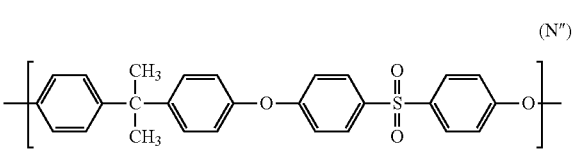
(N'')

the mol. % being based on the total number of moles in the polymer.

22. The method of claim 1, wherein the PAES polymer is a PSU comprising at least 80 mol. % of recurring units of formula (N''):

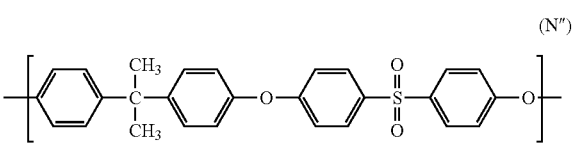
(N'')

the mol. % being based on the total number of moles in the polymer.

23. The method of claim 1, wherein the PAES polymer is a PSU comprising at least 90 mol. % of recurring units of formula (N''):

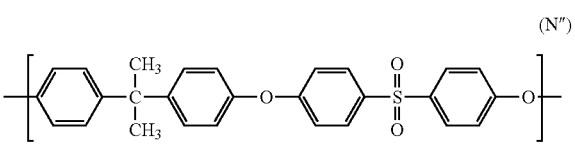
(N'')

the mol. % being based on the total number of moles in the polymer.

24. The method of claim 1, wherein the PAES polymer is a PSU comprising at least 95 mol. % of recurring units of formula (N''):

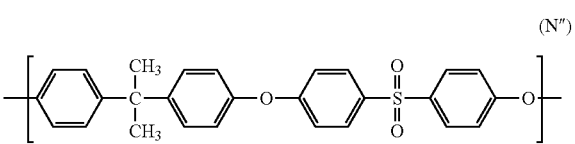
(N'')

the mol. % being based on the total number of moles in the polymer.

* * * * *

UNITED STATES PATENT AND TRADEMARK OFFICE
CERTIFICATE OF CORRECTION

PATENT NO. : 11,426,928 B2
APPLICATION NO. : 16/646158
DATED : August 30, 2022
INVENTOR(S) : Stéphane Jeol et al.

It is certified that error appears in the above-identified patent and that said Letters Patent is hereby corrected as shown below:

In the Claims

At Column 22, Claim number 2, Line number 26, is shown as "materila (M) has a dos-value" should read -- materila (M) has a $d_{0.5}$-value --.

Signed and Sealed this
Fifteenth Day of November, 2022

Katherine Kelly Vidal
*Director of the United States Patent and Trademark Office*